July 9, 1935.  E. M. BROGDEN  2,007,177
METHOD OF HANDLING FRESH FRUIT FOR MARKET
Filed Sept. 27, 1922    2 Sheets-Sheet 1
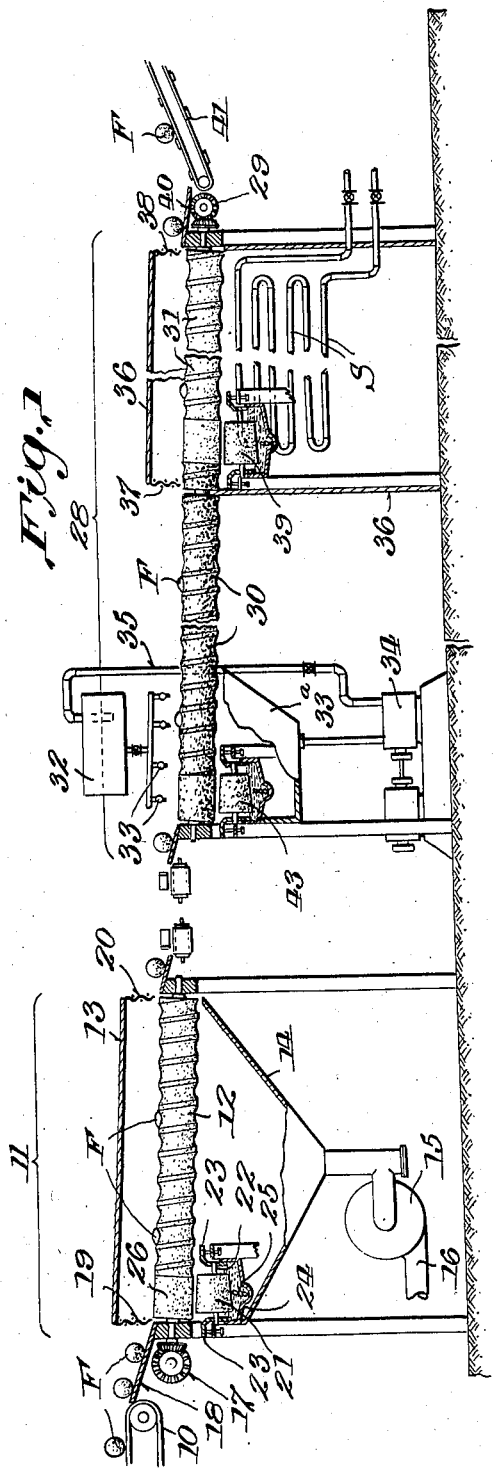
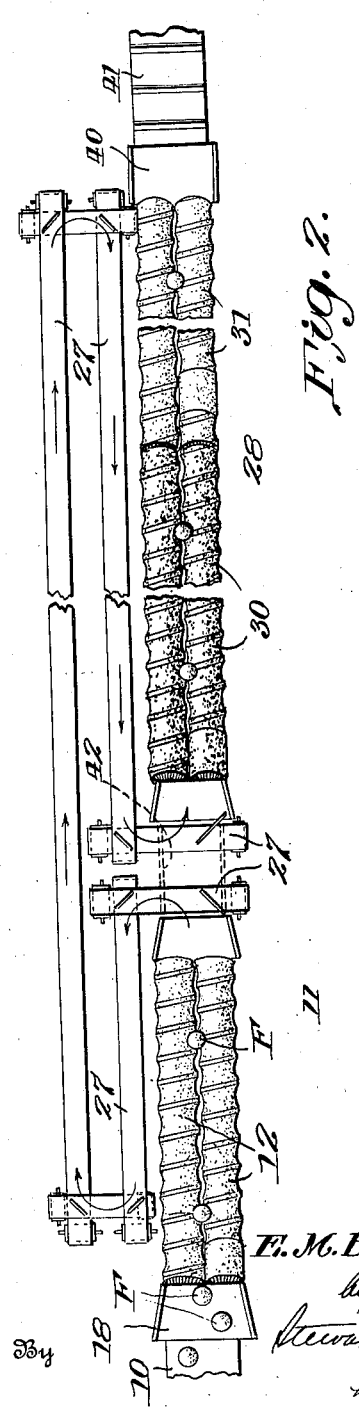

July 9, 1935.  E. M. BROGDEN  2,007,177
METHOD OF HANDLING FRESH FRUIT FOR MARKET
Filed Sept. 27, 1922   2 Sheets-Sheet 2

Inventor
E. M. Brogden,
By Steward & McKay
his Attorneys

UNITED STATES PATENT OFFICE 2,007,177

METHOD OF HANDLING FRESH FRUIT FOR MARKET

Ernest M. Brogden, Winter Haven, Fla., assignor to Brogdex Company, Winter Haven, Fla., a corporation of Florida Application September 27, 1922, Serial No. 590,979

3 Claims. (Cl. 99—8)

This invention relates to methods of handling fresh fruit for market; and it relates more particularly to the handling of fresh fruit in such manner as to enable getting it from the producer to the consumer in better condition than is possible by methods of distribution heretofore practiced, while at the same time a large proportion of the excessive handling costs and losses inherent in such prior methods are eliminated to the mutual advantage of both producer and consumer.

The present method is applicable to the handling of various fruits such as oranges, grapefruit, lemons, tangerines, apples, pears, peaches, plums, cantaloupes and the like; and also to vegetables such as cucumbers, tomatoes and the like. For the sake of convenience, the term "fruit" as employed in the appended claims is used in a broad sense, unless otherwise indicated, to include not only fruit as this term is employed in common parlance but also vegetables, insofar as fruit in this broad sense can be treated with advantage in the novel manner to be hereinafter disclosed.

Citrus fruits are typical of fruits to which the present invention can be applied with especially satisfactory results. Accordingly, in explaining the principles of the invention hereinafter, reference will be made more particularly to treatment or handling of citrus fruits as a concrete illustrative example, with the express understanding, however, that the scope of the invention is not limited thereby.

Modern methods of handling citrus fruits in getting them from the grower to the ultimate consumer are exceedingly complex and inherently uneconomical. The same is true in varying degree of other fruits in the broad sense of the term above indicated. This is the natural result of competitive effort to broaden and extend the field of distribution of these perishable commodities and at the same time to present them to the consumer in the most attractive and salable form. Years ago, the trade was satisfied to receive fruit that was discolored, scaly, or otherwise more or less unsightly, provided it was reasonably sound and in edible condition. Competition introduced methods of cleansing the fruit to render it bright, as well as other refinements such as wrapping in tissue paper and packing in crates under pressure according to carefully worked out systems involving large expense for labor and materials. The cleansing methods used have involved brushing and scouring the fruit in such manner as to remove much of the waxy and oily material which, in untreated fruit, constitutes a natural protective coating. This has resulted in speeding up the withering and shrinking of the fruit through evaporation of the juices. Furthermore this treatment renders the exposed rind or skin tissues an ideal medium for bacterial development, especially where water is used in the cleansing operation. Accordingly, notwithstanding the precautions customarily taken to remove surface moisture after the washing, such tissues still remain in a condition favorable for reception and development of mold and rot organisms, with which even sound fruit is almost certain to become inoculated from the wash water and the air in which vast numbers of blue mold spores and other inimical organisms are always present under conditions prevailing in ordinary packing house practice. The tissue paper in which the fruit is often wrapped serves to attract and hold moisture, thus further encouraging development of mold and rot organisms which of course thrive in a moist environment. In order to allow for shrinkage in transit, which commonly amounts to 10 per cent or more, and to ensure the boxes or crates being full upon arrival at market, it has been the universal practice to pack the boxes with a bulge by filling them beyond normal capacity and nailing the covers on under heavy pressure which often mashes some of the fruit and renders it unfit for use. In the case of distant markets, and especially in warm weather, refrigeration has been indispensable both in transit and after receipt at the distributing market in order to hold the fruit in even reasonably sound condition and to avoid prohibitive losses; and it is a well known fact that refrigerated fruit is extremely sensitive to deteriorating influences when removed from refrigeration. The foregoing are among the most important disadvantages and limitations inherent in the prior practice.

It is evident therefore that the various elaborate refinements characterizing the methods of handling citrus fruits heretofore, introduced primarily to meet the increasingly exacting demands of the trade for fruit of fine external appearance and to enable shipment to more and more distant markets, all tend to lower the resistance of the fruit to deteriorating influences and thus to lower the quality of the fruit received by the consumer as regards soundness, freshness, flavor and food value generally. Deterioration of such fruit after it finally arrives at its destination and is placed on sale is usually extremely rapid, as is well known, and the losses at this stage from spoiling are frequently excessive under most favorable conditions.

Since the introduction of the above-described complex system of preparing citrus fruit for market, it has not been the practice to ship any fruit but culls in bulk, that is, unboxed; and in the case of bulk shipments of culls, these have been only to nearby markets which could be reached quickly. Shipments in bulk have not been feasible on account of the excessive losses involved through spoiling.

The necessity that has existed heretofore for exercising the utmost care in handling the fruit at every stage of its progress from the grower to the consumer, as above set forth, has also given rise to elaborate marketing systems involving complicated and expensive organizations through one or another of which it has become practically essential that all commercial handling of citrus fruit take place. The maintenance of these organizations, coupled with sales commissions, and the various other factors of expense, of which some have been enumerated above, so load the fruit with charges of various kinds that the retail price to the consumer is always much greater than the price received by the grower. The perishable character of the commodity in question has, however, prevented heretofore the adoption of cheaper methods of handling and distribution.

The general object of the present invention is to provide a method of handling fruit, especially citrus fruit, whereby the fruit can be gotten much more directly from the grower to the consumer in better condition and with far less handling expense than by methods heretofore in vogue. More specific objects of the invention are to enable successful commercial shipment of citrus and other fruits in bulk and unwrapped, without refrigeration in transit or after receipt; to make possible direct and systematic distribution of fruit to consumers at the locality of receipt without subjecting it to handling through successive distributing agencies as must now be done; to produce a superior polish on the fruit where this is desired; and to accomplish the foregoing in a simple, economical and systematic manner.

With the foregoing objects in view, as well as others which will become apparent as the description proceeds, the invention consists in the novel method and steps thereof which will first be described in connection with a concrete illustrative example and will then be particularly pointed out in the claims.

In general the method or process of my invention involves treating fruit with a protective material effective to arrest or retard the natural processes of deterioration that would otherwise occur and to maintain the fruit for a long period of time in substantially the same condition of soundness, plumpness and freshness characterizing it when delivered by the grower at the place of shipment; and then shipping the treated fruit in bulk to a marketing point or place of distribution. In particular, the protective material used is advantageously of an oily nature so that in addition to exercising a preservative effect upon the fruit it acts as a lubricating agent to prevent injurious friction or rubbing between the surfaces of contacting pieces of fruit in the bulk shipments. Ordinarily this protective material most desirably includes a waxy material such as paraffin.

Another feature of the novel method in an especially desirable embodiment of the same is a waterless cleansing of the fruit, either preceding or simultaneously with the preservative treatment, which cleansing frees the surface of the fruit from dirt, scale, smudge and other foreign matter to a far greater extent than is attainable by ordinary washing methods, while at the same time the dangers and disadvantages of water washing are avoided and the employment of a drier is rendered unnecessary.

Most desirably the fruit is subjected, after receipt in bulk at its destination, to a thorough brushing and rubbing to remove dust, soot or the like that may have been deposited upon it in transit, and to further develop the gloss or polish which in some kinds of fruit is considered highly desirable by the purchasing public. I have found that by allowing a substantial period of time, several hours at least and more desirably several days, to elapse between the initial treatment of the fruit with preservative material and the final rubbing, as for example the period of time required for shipment to a distant market, a superior polish is obtainable. Especially is this true where the preservative material includes a waxy substance such as paraffine. A further advantage of this interposed interval of time is the opportunity thus given the oily material to dissolve or loosen difficulty removable foreign material which is therefore easily rubbed off. The treatment of the fruit after receipt at its destination may also include the application thereto of a further quantity of protective or preservative material.

Still another important feature of the invention, according to one of the various forms in which it may be practiced, is grading and sizing the fruit after arrival at its destination instead of before shipment, thus ensuring the ability to put a more dependably uniform quality of fruit of given grades and sizes into the consumer's hands than is possible by methods heretofore in use. In some cases, however, it is of advantage to grade and size the fruit before shipment, and this can be done within the scope of the broad invention.

The method of the invention may be carried out with the aid of comparatively simple apparatus. For example, at the point where the fruit is collected and shipped, the apparatus may comprise rubbing and brushing mechanism for cleansing the fruit with or without the aid of a non-aqueous liquid or fluent medium and for providing the fruit with a very thin film-like coating of a preservative material or composition, the fruit being conveyed directly from this apparatus into the freight car or other transporting vehicle without necessarily undergoing grading or sizing at this stage. At the marketing or distributing point to which the fruit is shipped, the apparatus may comprise means for rubbing and brushing the fruit and may optionally include means for applying a further quantity of preservative material thereto, together with means for grading and sizing the fruit where this is not done prior to shipment. Convenient apparatus of this character, suitable for use in practicing my invention, is illustrated more or less diagrammatically in the accompanying drawings, in which Fig. 1 is a side elevation, partly broken away and in section, of apparatus employed at the collecting or shipping point;

Fig. 2 is a plan view of the same; and

Figure 3:
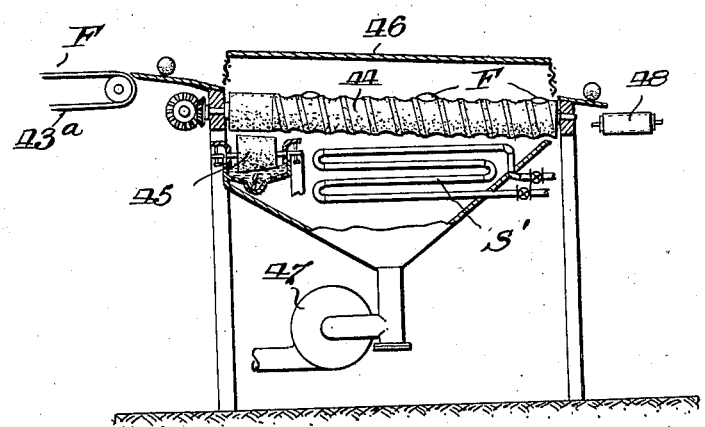
Fig. 3 is a side elevation, partly broken away and in section, of apparatus employed at the distributing point to which the fruit is shipped.

In practicing the invention with the aid of apparatus such as that here shown, and referring at first more particularly to Figs. 1 and 2, the fruit, oranges for example, is received at the treating plant from the groves in field crates or boxes which are emptied upon a conveyor belt 10, this belt conveying the fruit just as received to the apparatus unit indicated generally at 11. Any obviously unsound or infected fruit may desirably be picked out as the fruit rests on the belt and discarded. Said unit 11 comprises brush roll apparatus, shown in this instance as being generally of the well-known polisher type comprising a plurality of parallel and slightly inclined brush rolls 12 which cooperate in pairs to provide one or more runways along which the fruit, indicated at F, may travel toward the lower or discharge end of the apparatus. In the present example, this polisher apparatus is shown as comprising only two rolls providing a single runway; but it is to be understood that any desired number of rolls may be used to provide the necessary capacity of the apparatus. The brush rolls are in this instance provided with an enclosing cover or housing 13, having a hopper-shaped portion 14 below said rolls, in which dust and other foreign matter brushed off the fruit collects and is drawn out by a fan 15 and forced through conduit 16 to any convenient place of discharge. The brush rolls are both driven in the same direction, that is, either both clockwise or both counter-clockwise, by suitable driving mechanism indicated generally at 17. The fruit upon leaving the conveyor belt 10 rolls down over chute board 18 and enters the housing 13 by pushing aside a flexible door or flap 19 of canvas or the like, a similar flap 20 being provided for the exit.

The brush surfaces of the rolls 12 are here shown as grooved or ribbed to provide a spiral contour, and the direction of rotation is such that the spirals aid in advancing the fruit from the upper end of the rolls to the lower end. Means are provided for optionally applying to the brush rolls a non-aqueous liquid or semi-liquid medium to assist in the cleansing of the fruit. In the present example such means comprises a short applicator roll 21 carried on a shaft 22 that is journaled in brackets 23, which brackets are vertically adjustable with respect to the side walls of a tank 24 adapted to contain the non-aqueous cleansing medium. A helical agitator 25 may be provided in the bottom of this tank to keep the contents thereof well stirred.

The fruit in passing through the cleansing unit 11 may be treated in either one of two ways according to the kind and quantity of foreign matter on the surface of the fruit as it is received from the groves. In cases where the fruit is merely dusty, and is comparatively free from scale or smudge, it is only necessary to give the fruit a thorough dry brushing to attain the required cleansing effect. Where the brush surfaces of the rolls 12 are of medium stiffness, as is the case where the bristles consist of practically equal parts of horsehair and Tampico fiber, the necessary dry dusting of the fruit may be accomplished very readily without damage to the fruit. Under these circumstances the applicator roll 21 is lowered so that it does not engage the brush rolls 12, the applicator therefore remaining idle. However, where the fruit carries much scale or smudge, or both, proper cleansing cannot be effected merely by dry brushing; and in that case the applicator roll is raised so that it contacts with the smooth initial section 26 of one or more of the brush rolls and is thus frictionally driven by the brush rolls. The applicator roll 21 dips into a non-aqueous cleansing medium in the tank 24 and in rotating it transfers this medium to the brush rolls in quantity which can be controlled by adjusting the pressure with which the applicator roll 21 engages roll section 26. The non-aqueous cleansing medium should in general be of such character that it acts to dissolve or loosen the scale and smudge on the fruit and thus renders removal by the brushing surfaces relatively easy. Its specific character may vary considerably, however, as will be more fully pointed out hereinafter.

Assuming that the fruit handled requires the employment of a non-aqueous cleansing medium in conjunction with the brushing, as just described, the fruit receives in unit 11 a liberal coating of said liquid medium which is spread all over its surface by the wiping action of the brush rolls. The brush rolls also serve to remove any of the foreign material on the surface of the fruit that is sufficiently loosened to permit this before the fruit leaves said unit. However, a fairly substantial time is often required for the solvent medium to exert its loosening or dissolving action to the best advantage, and means are accordingly provided whereby full opportunity is afforded for this solvent action to occur. In this instance the fruit leaving unit 11 through exit 20 is discharged upon a belt conveyor indicated generally at 27 which travels in a circuitous route as shown and thus constitutes what may be termed a delay unit. This conveyor finally delivers the fruit to a third unit indicated generally at 28, which may be termed the finishing unit. The period of time during which the fruit rests quietly on the belt conveyor 27 on its way to unit 28 may vary in practice according to the length of time necessary to thoroughly loosen the scale, smudge, or the like, on a given lot of fruit; and it may amount to as much as five or ten minutes in a typical instance. In general, the apparatus comprised in unit 28 is similar in many respects to that of unit 11, being characterized especially by the employment of any desired number of brush rolls, two in this instance, cooperating to provide one or more fruit runways and rotated by suitable driving mechanism 29, all as before described in the case of unit 11. These brush rolls are most advantageously considerably longer, however, than brush rolls 12. In a typical instance, they may be from twelve to fourteen feet long, as against say six or seven feet long for brush rolls 12. Furthermore, the first or upper section 30 of each of the brush rolls of unit 28 is desirably of relatively stiff bristles such as Tampico fiber, this section in practice constituting in some cases as much as two-thirds of the entire length of each brush roll; while the remaining or lower section 31 consists of mixed horsehair and Tampico fiber of the character previously described. The relatively stiff bristles of the brush roll sections 30 act to thoroughly complete the cleansing action initiated and partially carried out by the preceding units 11 and 27, the scale and smudge by this time being thoroughly loosened through the action of the non-aqueous washing medium before mentioned. In some cases it is desirable to shower more solvent down upon the fruit as it is delivered to the upper ends of the brush roll sections 30; and for this purpose an elevated supply tank 32 is shown connected to valved cocks or spray jets 33 which can be opened to shower solvent down upon the fruit as it is delivered to this unit, the excess liquid falling into a collecting tank 33ᵃ, from which it may be returned by pump 34 through pipe 35 to the supply tank.

After being acted upon by the brush roll sections 30, the fruit in continuing its travel toward the lower end of unit 28 passes over the lower sections 31 which have somewhat softer brushing surfaces as stated. Under the particular conditions of operation assumed, the fruit here receives an application of preservative coating composition, a mixture of paraffin and hydrocarbon solvent, for example, which is spread all over the surface of the fruit in a thin film by the rubbing and wiping action of the brush roll sections 31. This operation is conducted to best advantage in a moderately heated environment; and for this reason the brush roll sections 31 are shown enclosed in a suitable housing 36, having flexible closures or flaps 37 and 38, for entry and exit, respectively, of the fruit. This housing is heated by means of steam coils S or other suitable heating means. A temperature of from 130° to 140° within the housing, or somewhat above the melting point of paraffin, where paraffin is employed, has been found satisfactory in practice. Any suitable means may be employed for supplying preservative material to the fruit as it is acted upon by the brush roll sections 31. In this instance an applicator device, indicated generally at 39 and similar in all essential respects to the applicator device already described in connection with unit 11, is employed for this purpose. In the drawings the adjustable roll of the applicator is shown out of contact with the brush rolls, but it is to be understood that it is moved into engagement therewith when the fruit is to be treated as above described.

From the unit 28, the fruit is delivered over chute board 40 to any suitable conveyor device, such as elevator mechanism 41, by which it may be carried directly into a freight car or other transporting means for shipment in bulk to a distant point of distribution.

Returning now to the fruit as it leaves unit 11, and assuming in another case that the fruit instead of carrying much scale and smudge, is merely dusty, it receives merely a dry brushing or dusting in unit 11, without application of any liquid cleansing medium thereto. Under these circumstances it is evidently unnecessary to interpose any delay before delivering the fruit to unit 28, and accordingly the fruit may, under these conditions, be delivered directly to unit 28 by way of a removable chute device indicated in dotted lines at 42 in Fig. 2. Under the conditions assumed in this second case, the preservative composition is applied to the fruit as soon as it is delivered to the brush roll sections 30 of unit 28, partly because dry brushing the fruit with the relatively stiff bristles of these sections might damage the fruit. Said composition is applied through the agency of an applicator device indicated generally at 43, and similar in all essential respects to those previously described. The applicator roll of applicator device 39, on the other hand, is lowered out of engagement with the brush rolls and remains idle under these conditions, the spray and pump mechanism 33—34 also remaining idle.

The fruit is thoroughly daubed and rubbed with the preservative composition by the action of the brush roll sections 30 and then enters the heated chamber enclosed in housing 36, where the coating is wiped and smoothed into a thin sealing film by the action of brush roll sections 31 as already described, going thence by way of conveyor 41 to the freight car or other shipping means.

The non-aqueous cleansing medium optionally employed in the applicator device of unit 11 may be, for example, a fraction obtained in the refining of petroleum. For instance, ordinary kerosene serves satisfactorily in this capacity since it is compatible or miscible with the oily matter naturally present upon and in the skin of an orange or other citrus fruit and can thus act effectively as a solvent to loosen tenaciously adherent foreign matter on the surface of the fruit, such as scale or smudge. A still more desirable washing medium, however, is a light oil, in the nature of a highly refined kerosene, a typical oil of this class having a gravity of 42°–44° Baumé, and that distills over substantially completely between the approximate limits of 360° F. and 486° F. Oil of this character has a flash point of about 149° F. and possesses only a very slight odor of kerosene. Another type of oil that has also given excellent results as a washing medium in the practice of my invention is a colorless, tasteless and odorless mineral oil, derived from petroleum, having a gravity of 37°–38° Baumé, a viscosity at 100° F. of 70–73 seconds, a flash point of 340°–350° F., and a distillation range of from about 600° F. to 745° F. It is to be understood however that the foregoing are merely typical of non-aqueous solvents or liquids, specifically oils, that are applicable in the practice of the present invention. The principal requirements for such washing medium are that the solvent be fairly light and more or less volatile, that it be unobjectionable in its action upon the fruit and that it have a solvent or loosening action upon scale, smudge and the like. It is to be understood that a washing medium of this character is also employed in the pump and spray mechanism 33—34, when this mechanism is in use. It should be understood, however, that the washing medium need not consist of the aforesaid liquids or solvents only but may optionally contain other ingredients to aid not only in the cleansing action but also, if desired, to provide the final preservative coating either wholly or in part. For example, it is advantageous in some cases that the washing medium used in the applicator device of unit 11 consist of a fairly light oil of the character above described together with about 10 per cent or so of paraffin. The paraffin seems to assist in attaining effective removal of foreign matter, and at the same time a certain amount of it remains on the surface of the fruit and forms a sealing film even without application of further composition.

The composition employed in the applicators 39 and 43 advantageously comprises a mixture of a solvent oil of either of the types hereinbefore described and a preservative coating agent such as paraffin. In a typical instance the mixture may comprise from 30 to 60 parts of paraffin and from 70 to 40 parts of the liquid or solvent, all parts being by volume. The exact proportions depend upon such variable factors as the character of the fruit, temperature of operation, etc. It is to be understood that both the washing medium and the thicker coating composition may contain additional ingredients for special purposes such as harmless coloring agents, and an agent, such as amyl acetate or hexyl acetate, giving a pleasant odor; but such additional ingredients are by no means essential.

For shipping fruit as above described, any suitable transporting means that affords reasonably good ventilation and that prevents freezing of the fruit in cold weather, can be employed. For example, refrigerator cars of the ordinary type provided with adjustable ventilators at the ends serve admirably, but it is unnecessary to ice the cars or to take any other precautions to keep the fruit cool in transit. In practice the fruit is simply delivered into the car by conveyor 41 which can be provided with an extension adjustable to distribute the fruit properly in the car. It is to be noted moreover that the fruit is not wrapped or boxed as has been the universal practice heretofore. The fruit being coated with material having lubricating properties, the friction of the pieces of fruit one against another, caused by jolting of the car, does not result in the skin becoming abraded as would otherwise be the case. Given reasonably good ventilation, fruit may be shipped in bulk in this way very successfully and will reach its destination in excellent condition even when it has been as much as two or three weeks in transit. By the expression "shipment in bulk", I do not mean to exclude cases where partitions or bulkheads are placed in the car to prevent undesirable shifting of the load or even where the fruit is placed loose in individual containers such as boxes or crates but unwrapped and not specially packed. I believe it to be broadly new to ship fruit in bulk in this broad sense where the pieces of fruit are unwrapped and are in actual rubbing contact with each other and where the fruit is provided with a coating of a lubricating agent of some kind that prevents damage by reason of such rubbing contact such as waxy or oily material or both.

While mention has been made more particularly of shipping the fruit in freight cars, it is to be understood that bulk shipment in other ways is also contemplated herein, as for example bulk shipment in the hold of a ship.

While cleansing of the fruit without the use of water is more particularly referred to herein and is considered much the best procedure, nevertheless it is not to be inferred that, in its broader phases, the method of the invention necessarily excludes the employment of water for cleansing in all cases; for the benefits of the invention can be realized at least in part even where water washing is resorted to.

When the fruit arrives at its destination, its surface usually carries more or less foreign matter such as soot and dust that has collected upon its coated surface in transit and that renders the fruit more or less unsightly. Furthermore, the fruit as it was delivered into the car or ship hold at the shipping point did not possess as much gloss or polish as is desired in the trade. This is because it is not easy to give fruit a good permanent polish or gloss at the same time that the preservative coating of wax or the like is being applied. At the time of application, the wax is in a comparatively soft and unset condition, due in part to the presence of the accompanying solvent where this is used; and under these conditions, while a reasonably good polish can be had, a higher polish is desirable. However, after the lapse of several days or even weeks, the gradual evaporation of the solvent and the resultant setting or hardening of the adherent wax film covering the surface of the fruit, renders it possible then to obtain a much better polish or gloss by rubbing the film-coated fruit.

Referring to Fig. 3 which illustrates more or less diagrammatically one form of apparatus that can be employed at the distributing or marketing point to which the fruit is shipped as above described, the fruit is delivered from the box car by suitable conveyor means such as conveyor belt 43ª to a brush roll polisher unit of which the polisher rolls are indicated at 44. This may be similar in general to the polisher mechanism forming a part of unit 11 at the shipping point, above described and is conveniently provided with an applicator device 45 of the same type as those already described. If desired, the polisher mechanism may be enclosed in a housing 46 heated by steam coils S', this arrangement being similar to that employed for the lower roll sections 31 of unit 28. The employment of a heated housing is not indispensable but is advantageous, especially in cold weather. The fruit delivered to the brush rolls 44 may either be subjected merely to a thorough rubbing and polishing by these brushes, or the applicator 45 may be set in action to supply further coating and polishing material to the fruit, according to the condition and character of the fruit when it is received. Assuming in the first instance that no additional coating material is applied to the fruit, the brushing and rubbing effected by the polishing rolls 44 not only serves to remove soot and dirt that has accumulated on the fruit in transit, but it has the further effect of producing a very much better polish or gloss on the fruit than it was possible to attain at the time of the before described treatment at the shipping point, the thin filmlike coating of paraffin having in the meantime set or hardened to such an extent that it will take a much better polish than could be given it at the time it was applied. The dust and soot brushed off the fruit in this operation may be drawn out of the housing by fan 47.

In some cases the desired polish on the fruit can be obtained still more easily by using the applicator device 45 to supply an oily liquid, such as one of the oils hereinabove described, to the brush rolls so that a small quantity is wiped and rubbed over each piece of fruit passing down the rolls. This application of such liquid apparently does not act upon the set or hardened paraffin film coating to any substantial exent, and when applied at this stage it seems merely to smooth out slight irregularities and gives an excellent glossy finish to the fruit. A certain amount of paraffin may also be dissolved in or mixed with the solvent, say 10 to 20 per cent by volume, whereby a very thin protective film of paraffin may be superposed upon the first or basic film layer applied at the point of shipment. The composition applied to the fruit at this time may also contain ingredients especially adapted to enhance the polish on the fruit, such as a small percentage of rosin or other suitable gum, for example. The set or hardened basic paraffin film originally applied at the shipping point serves as a protecting envelope, so that it is possible at this stage to apply to the fruit any desired polishing substance harmless to human beings without having to consider whether or not the keeping quality of the fruit would be affected if such substance were brought into direct contact with the fruit rind itself.

The employment of heat in the housing is optional, as before stated; but it is often advantageous, especially in cold weather, to maintain the temperature within the housing at around 130° to 140° F. as the character of the polish is in general improved under these conditions.

From the polisher rolls 44 the fruit is delivered to the grading belt 48, which may be of the ordinary and well known type, after which the several grades of fruit go to sizers (not shown) which may also be of standard and well known construction. The fruit thus graded and sized may be put up in packages of suitable character, such as cartons containing half a dozen or a dozen pieces of fruit, or in larger units, as may be desired. The described method of handling the fruit makes it possible to distribute the fruit to consumers in inexpensive containers of any convenient size without the necessity for its going through the usual marketing channels heretofore necessitated by the perishable nature of the fruit. In fact, fruit treated and handled in accordance with the present invention practically ceases to be a perishable commodity, relatively speaking, and its distribution is therefore greatly simplified and cheapened. It is to be especially noted that, notwithstanding this simplification and cheapening, the quality and appearance of the fruit is not only as good as was obtainable previously in the trade, but is uniformly superior thereto, and this without employment of refrigeration at any stage of the handling of the fruit. Whereas previously it was essential that fruits such as oranges and grapefruit should be in the hands of the ultimate consumer in not to exceed 15 to 20 days from date of shipment on the average, such fruit treated in accordance with the present invention remains sound, plump and of practically its original freshness and flavor for periods as long as six weeks to two months, or even longer in many instances.

The method of deferring the grading and sizing of the fruit until it has arrived at the marketing point has the great advantage of enabling the elimination at this late stage of occasional pieces of fruit that may have rotted or become otherwise of poor quality through internal infection by mold or rot organisms not apparent at the time the fruit was shipped but which developed only during the interval between shipment and receipt at the marketing point. While the described preservative coating prevents infection from the exterior, it does not ordinarily save fruit that has been previously infected internally. The ultimate consumer is thus assured of receiving fruit of more uniformly high grade than was possible under the methods previously in vogue.

What I claim is:

1. The method of handling fresh fruit for market which comprises dry-cleansing the fruit and providing it with a thin protective coating of a composition comprising waxy material and an oily vehicle, shipping the coated fruit, and rubbing the fruit after receipt at its destination with a composition comprising waxy material and an oily vehicle.

2. The method of handling fresh fruit for market which comprises dry-cleansing the fruit and providing it with a thin protective coating of a composition comprising waxy material and an oily vehicle, shipping the coated fruit, and rubbing the fruit after receipt at its destination with a composition comprising waxy material and an oily vehicle, the last mentioned composition being of thinner consistency than the first.

3. The method of handling fresh fruit for market which comprises dry-cleansing the fruit and providing it with a thin protective coating of a composition comprising waxy material and an oily vehicle, shipping the coated fruit, and rubbing the fruit after receipt at its destination with a composition comprising waxy material and an oily vehicle, together with additional material adapted to enhance the polish produced on the fruit.

ERNEST M. BROGDEN.